United States Patent
Unterforsthuber et al.

(10) Patent No.: US 6,349,997 B1
(45) Date of Patent: *Feb. 26, 2002

(54) DEVICE FOR DISPLAYING THE ACTIVE STATE OF A BRAKING SYSTEM IN MOTOR VEHICLES

(75) Inventors: Jakob Unterforsthuber, Maisach; Johan Mitterer, Munich, both of (DE)

(73) Assignee: Bayerische Motoren Werke Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 645 days.

(21) Appl. No.: 08/691,330

(22) Filed: Aug. 2, 1996

(30) Foreign Application Priority Data

Aug. 2, 1995 (DE) .......................... 195 28 408

(51) Int. Cl.$^7$ ................................ B60T 17/22
(52) U.S. Cl. ................... 303/138; 188/1.11 E
(58) Field of Search ............... 188/1.11 R, 1.11 E; 303/138, 20

(56) References Cited

U.S. PATENT DOCUMENTS

| | | | | |
|---|---|---|---|---|
| 3,601,795 A | * | 8/1971 | Blomenkamp et al. | 303/138 |
| 3,629,815 A | * | 12/1971 | Hattwig | 303/138 |
| 3,794,972 A | * | 2/1974 | Van Ostrom | 303/138 |
| 4,702,336 A | * | 10/1987 | Seibert et al. | 180/197 |
| 5,149,176 A | * | 9/1992 | Eccleston | 188/1.11 E |
| 5,369,585 A | * | 11/1994 | Okubo | 364/426.02 |
| 5,378,052 A | * | 1/1995 | Yoshino | 303/20 |
| 5,433,296 A | * | 7/1995 | Webberly | 188/1.11 |

FOREIGN PATENT DOCUMENTS

| | | | |
|---|---|---|---|
| DE | 30 02 279 | 7/1981 | |
| DE | 34 27 358 | 2/1986 | |
| DE | 35 27 532 | 2/1987 | |
| DE | 41 08 948 | 9/1992 | |
| DE | 42 35 690 | 5/1994 | |
| DE | 43 19 833 | 12/1994 | |
| JP | 0068254 | * 3/1990 | 188/1.11 |

* cited by examiner

Primary Examiner—Matthew C. Graham
(74) Attorney, Agent, or Firm—Crowell & Moring LLP

(57) ABSTRACT

In a device for displaying the active state of a braking system in motor vehicles, a display comparing a value proportional to the maximum possible braking force with a value proportional to the actual braking force is provided in the driver's field of vision.

7 Claims, 1 Drawing Sheet

DEVICE FOR DISPLAYING THE ACTIVE STATE OF A BRAKING SYSTEM IN MOTOR VEHICLES

BACKGROUND SUMMARY OF THE INVENTION

The invention relates to a device for displaying the active state of a braking system in motor vehicles.

Thus far it has been known to control a known pilot light for indicating defects in a pulsed manner to display the active state of a braking system in motor vehicles, especially an anti-lock braking system (ABS) and/or an acceleration spin control system (ASC) with braking intervention. However, a flashing pilot light used to display the active state of the braking system can lead the driver to suspect incorrectly that there is a defect in the braking system.

It is also known that the active state of a braking system can be detected by the driver haptically, especially in the form of vibrations at the brake pedal. However, this haptic signal will be absent in future braking systems that are controlled purely electronically. If there is no indication whatsoever of the active state of the braking system, the driver could gain the impression, especially at very low coefficients of friction, that the action of the brakes is insufficient.

There is therefore needed an improved device of the above-mentioned type such that the driver firstly is not irritated and secondly is sufficiently informed about the braking process influenced by the braking system.

These needs are met according to the present invention by a device for displaying the active state of a braking system in motor vehicles. A display compares a value proportional to the maximum possible braking force with a value proportional to the actual braking force. The display is provided in the driver's field of vision.

According to the invention, a display is provided in the driver's field of vision. The display compares a value proportional to the maximum possible braking force with a value proportional to the actual braking force.

A value proportional to the braking force, for example, is the braking force itself, the deceleration resulting therefrom, or the stopping distance resulting therefrom. The maximum possible braking force and/or the value proportional to the maximum possible braking force can be determined and displayed variably as a function of driving parameters.

The comparative display can be in the form of numerical values, percentages, or bars for example.

In addition, a supplementary optical or acoustic signal can be produced when the value proportional to the actual braking force is equal to the value proportional to the maximum possible braking force.

However, the comparative display can also be presented in the form of a single item of information that expresses, for example, a difference or a percentage that indicates how close the value proportional to the actual braking force is to the value proportional to the maximum possible braking force. For example, if proximity sensors for determining the proximity of the vehicle to the vehicle ahead are provided in the vehicle, a display can be provided that compares the stopping distance resulting from the braking force existing at the moment with the maximum permissible braking distance to prevent a rear-end collision.

One advantageous improvement on the invention variably determines the value proportional to the maximum possible braking force as a function of a tire-road coefficient of friction instantaneously determined.

According to the invention, the value proportional to the maximum possible braking force is determined variably as a function of the tire-road coefficient of friction determined at the moment.

Various methods are already known for determining the tire-road coefficient of friction existing at the moment. For example, an additional display of this coefficient of friction could be provided.

The display device according to the invention prevents the driver from suspecting that the braking action is insufficient, especially at low coefficients of friction. In addition, when the value proportional to the actual braking force is smaller than the value proportional to the maximum possible braking force, the driver is informed that further deceleration is possible by increasing the braking force using the brake pedal.

Other objects, advantages and novel features of the present invention will become apparent from the following detailed description of the invention when considered in conjunction with the accompanying drawings.

BRIEF DESCRIPTION OF THE DRAWING

The sole drawing shows an embodiment of the invention providing a view display in the form of a bar chart comparing the maximum possible braking force with the actual braking force.

DETAILED DESCRIPTION OF THE DRAWING

Figure 1:
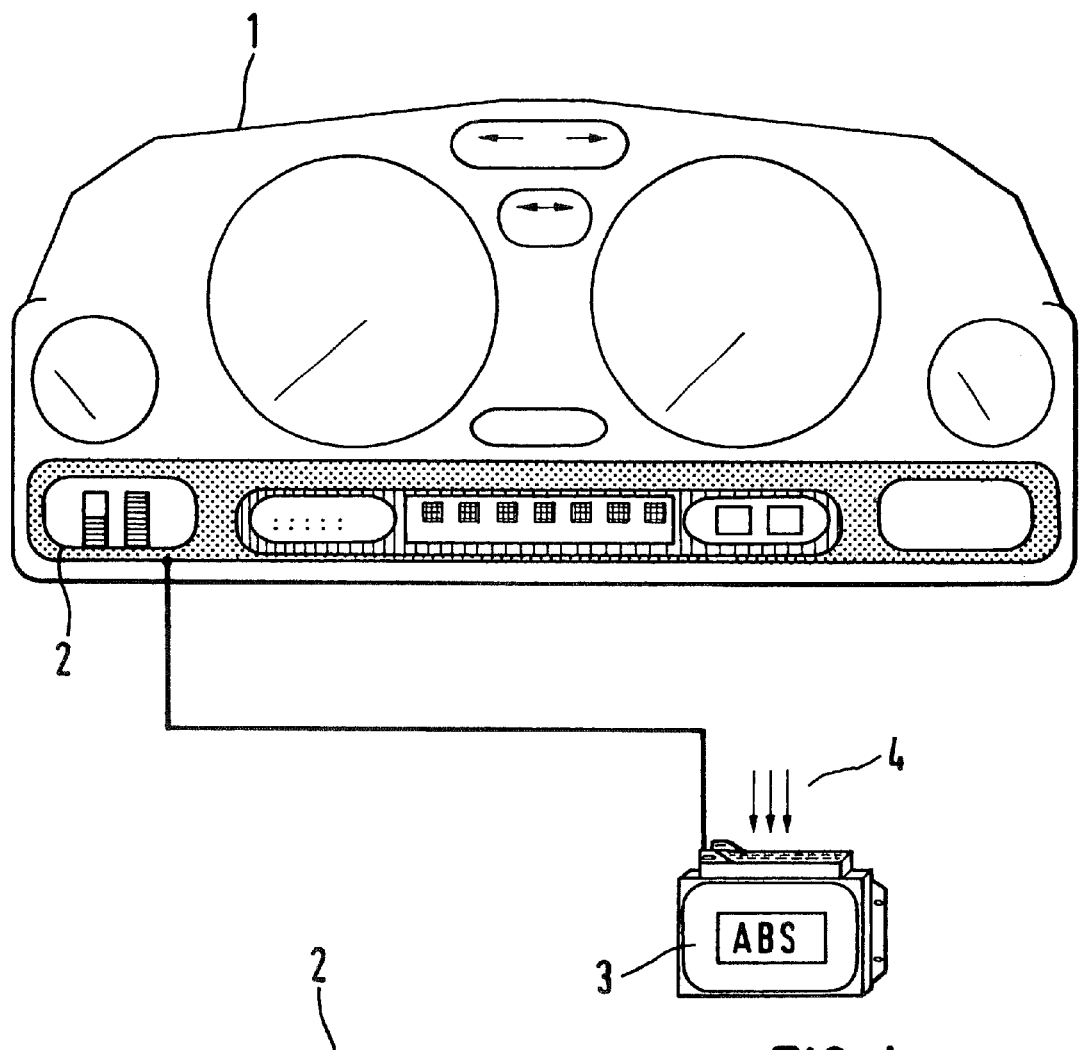
Figure 2:
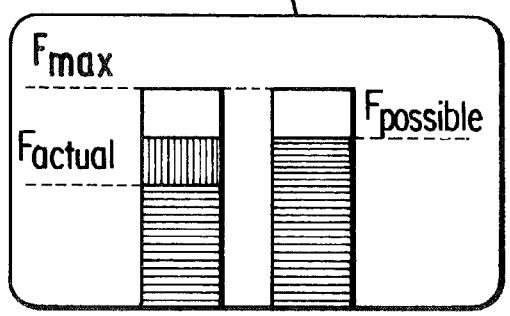

In the single figure, an instrument cluster 1 of a motor vehicle has a display unit 2. Display unit 2 is controlled by control device 3 of an ABS (anti-lock braking system). The control device of the ABS receives various input signals 4, for example the speed of the vehicle, a power demand signal, and/or the rpm values of all the wheels of the vehicle. Depending on the input signals 4 of the control device 3, a current maximum possible braking force $F_{possible}$ is calculated and displayed on the display unit 2 as the portion of the right-hand bar that is filled. The left-hand bar on the display unit 2 compares the actual breaking force $F_{actual}$ with the currently maximum possible braking force $F_{possible}$. The actual breaking force $F_{actual}$ likewise is calculated for example by the control device 3 as a function of the input signals 4, which for example can also include the actuating force exerted on the brake pedal. The gray area of the left bar indicates by what amount the actual braking force can be increased for even sharper deceleration. In addition, an absolute maximum possible braking force $F_{max}$ can be displayed, said force however being achieved only with optimum coefficients of friction, for example.

Instead of the braking force being displayed, the deceleration or the stopping distance can be displayed instead as a value proportional to the braking force. For example, if the stopping distance is displayed, the value that is proportional to the maximum possible braking force corresponds to the minimum possible stopping distance. If, on the other hand, the deceleration is displayed, the value that is proportional to the maximum possible braking force also corresponds to the maximum possible deceleration.

It is precisely when the braking system is in the active state that the maximum possible braking force $F_{possible}$ is less than the absolute maximum possible braking force $F_{max}$. By means of the display according to the invention in the embodiment, firstly, the active state of the braking system and secondly, the resultant maximum possible braking force $F_{possible}$ are displayed to the driver. By comparison with the actual braking force $F_{actual}$, an indication is provided either that, despite the active state of the braking system, a further increase in the actual braking force is still possible (the black part of the left-hand column) or that the maximum possible braking force is already acting in regard to the active state of the braking system (the gray part of the left column).

This display according to the invention comprehensively informs the driver about the action of the braking system at the moment.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for displaying an active state of a braking system in a motor vehicle to a driver of the motor vehicle, comprising:

a display arranged in said driver's field of vision, said display comparing a value ($F_{possible}$) indicating a maximum possible braking force with a value ($F_{actual}$) indicating an actual braking force of said motor vehicle throughout the active state of the braking system.

2. The device according to claim 1 wherein the value ($F_{possible}$) proportional to the maximum possible braking force is determined variably as a function of a tire-road coefficient of friction of the vehicle determined at the moment.

3. A device for displaying an active state of a braking system in a motor vehicle to a driver of the motor vehicle, comprising:

a control device for the braking system;

a display coupled with the control device, said display being arranged in said driver's field of vision, wherein said control device outputs display information to the display which indicates to the driver a comparison of a value ($F_{possible}$) indicating a maximum possible braking force with a value ($F_{actual}$) indicating an actual braking force of said motor vehicle throughout the active state of the braking system.

4. A device for displaying an active state of a braking system, the device comprising:

a control device receiving vehicle input signals and calculating a first value indicating a maximum possible braking force and a second value indicating an actual braking force; and a comparative display coupled to said control device, said comparative display providing an indication to a driver of the actual braking force and the maximum possible braking force.

5. A device according to claim 4, wherein said comparative display comprises:

a first visual indicator displaying the value proportional to the maximum possible braking force; and a second visual indicator arranged near said first visual indicator and displaying the value proportional to the actual braking force.

6. A device according to claim 5, wherein said first and second visual indicators are bars.

7. A device according to claim 4, wherein said comparative display comprises a numerical value display.

* * * * *